(12) United States Patent
Tamatsu et al.

(10) Patent No.: US 10,354,185 B2
(45) Date of Patent: Jul. 16, 2019

(54) LEARNING APPARATUS, LEARNING PROGRAM, AND LEARNING METHOD

(71) Applicant: DENSO CORPORATION, Kariya, Aichi-pref. (JP)

(72) Inventors: Yukimasa Tamatsu, Okazaki (JP); Ikuro Sato, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 707 days.

(21) Appl. No.: 14/540,277

(22) Filed: Nov. 13, 2014

(65) Prior Publication Data

US 2015/0134583 A1 May 14, 2015

(30) Foreign Application Priority Data

Nov. 14, 2013 (JP) .................................. 2013-235845

(51) Int. Cl.
*G06N 3/04* (2006.01)
*G06N 3/08* (2006.01)

(52) U.S. Cl.
CPC ...... *G06N 3/08* (2013.01); *G06N 3/04* (2013.01)

(58) Field of Classification Search
CPC ........................................................ G06N 3/04
See application file for complete search history.

(56) References Cited

FOREIGN PATENT DOCUMENTS

JP          3757722          1/2006

OTHER PUBLICATIONS

S. Zurada, A. Malinowski, and I Cloete, "Sensitivity Analysis for Minimization of Input Data Dimension for Feedforward Neural Network", Proc. IEEE Int'l Symp. on Circuits and Systems, 1994, pp. 447-450.*
J. Sietsma and R.J.F. Dow, "Neural Network Pruning—Why and How", Proc. 2nd Int'l Conf. on Neural Nets., Jul. 1998, pp. 326-338.*
X. Liang, "Removal of Hidden Neurons by Crosswise Propagation", Neural Information Processing—Letters and Reviews, vol. 6, No. 3, Mar. 2005.
Y. Le Cun et al, "Handwritten Digit Recognition with a Back-Propagation Network", Advances in Neural Information Processing Systems (NIPS), pp. 396-404, 1990.

* cited by examiner

*Primary Examiner* — Vincent Gonzales

(74) *Attorney, Agent, or Firm* — Harness, Dickey & Pierce, P.L.C.

(57) ABSTRACT

A learning apparatus performs a learning process for a feed-forward multilayer neural network with supervised learning. The network includes an input layer, an output layer, and at least one hidden layer having at least one probing neuron that does not transfer an output to an uppermost layer side of the network. The learning apparatus includes a learning unit and a layer quantity adjusting unit. The learning unit performs a learning process by calculation of a cost derived by a cost function defined in the multilayer neural network using a training data set for supervised learning. The layer quantity adjusting unit removes at least one uppermost layer from the network based on the cost derived by the output from the probing neuron, and sets, as the output layer, the probing neuron in the uppermost layer of the remaining layers.

15 Claims, 12 Drawing Sheets

INPUT LAYER — HIDDEN LAYER — OUTPUT LAYER

UNIT

PN

「IS SIGN PRESENT OR NOT ?」

STOP
NO PARKING
SLOW DOWN
ONE WAY
ROAD CLOSED
LANE ENDS 28
28

LEARNING APPARATUS, LEARNING PROGRAM, AND LEARNING METHOD

CROSS-REFERENCE TO RELATED APPLICATION

This application is based on and claims the benefit of priority from Japanese Patent Application No. 2013-235845, filed Nov. 14, 2013, the disclosure of which is incorporated herein in its entirety by reference.

BACKGROUND

Technical Field

The present invention relates to a learning apparatus, a learning program, and a learning method for performing a learning process of a feed-forward multilayer neural network with supervised learning.

Related Art

A multilayer neural network obtained by a learning process with supervised learning is usable as an excellent calculation model that has a high discriminative capability. A theory has not yet been established that explains, when deciding structure of a multilayer neural network during a learning process with supervised learning, which type of structure of a multilayer neural network provides high generalization capability (discriminative capability regarding data not used for a learning process) regarding a certain piece of training data that has been provided. Thus, a heuristic method has been used as a method for obtaining structure of a multilayer neural network that has high generalization capability.

For example, in X. Liang, "Removal of Hidden Neurons by Crosswise Propagation", Neural Information Processing—Letters and Reviews, Vol. 6, No. 3, 2005, a method for constructing an optimal network structure is proposed. In this method, units of each hidden layer in the multilayer neural network are removed one at a time. In this method, in a state in which the multilayer neural network at an initial setting (referred to, hereinafter, as simply an "initial multilayer neural network" or "initial network") has been sufficiently trained, units are eliminated in the following manner.

That is, a correlation between the outputs of differing units in the same layer is calculated for the training data. A single unit having the highest correlation is then removed. After the unit is removed, learning of weights other than that of the removed unit is restarted. Relearning and unit removal are repeatedly performed until a cost function (also called, e.g., an objective function or an error function) defined in the network begins to increase. The structure of the initial network is provided manually.

In addition, JP-B-3757722 describes a method for optimizing the number of units in an intermediate layer (hidden layer) of a multilayer neural network in supervised learning.

The above-described conventional methods for deciding the multilayer neural network structure share a commonality. That is, the initial network is trained first. The number of units are increased and decreased based on an index that indicates that an improvement in generalization capability can be expected. The number of units in the hidden layers is thereby automatically decided. In other words, in the conventional methods, the number of units is optimized while the number of layers is fixed. Therefore, the number of layers per se is not optimized.

The multilayer neural network is generally considered to have favorable discriminative capability. However, discrimination becomes more time-consuming as the number of layers increase. Therefore, the number of layers is a parameter that significantly affects discriminative capability and calculation amount. However, as described above, a method for optimally deciding the number of layers has not been proposed.

In addition, regarding convolutional neural networks (CNN) as well, the number of filter layers and the number of fully connected layers that follow the filter layers are currently decided manually by a designer. A method for deciding the optimal numbers of filter layers and fully connected layers has not been proposed.

SUMMARY

It is thus desired to provide a learning apparatus, a learning program, and a learning method for automatically adjusting the number of layers in a multilayer neural network.

A first exemplary embodiment of the present disclosure provides a learning apparatus that performs a learning process for a feed-forward multilayer neural network with supervised learning.

The feed-forward multilayer neural network includes a plurality of layers configured by an input layer that is a lowermost layer of a layered structure of the multilayer neural network, an output layer that is an uppermost layer of the layered structure, and at least one hidden layer that is located between the input layer and the output layer. Each of the layers includes a given number of units that receive an input, perform a predetermined calculation based on the input and a weight to produce an output, and transfer the output to a next layer. The at least one hidden layer includes at least one probing neuron that receives an input from a previous layer, performs a predetermined calculation based on the input and a weight to produce an output, but does not transfer the output to a next layer.

The learning apparatus includes a learning unit and a layer quantity adjusting unit. The learning unit performs a learning process by calculation of a cost derived by a cost function defined in a multilayer neural network using a training data set for supervised learning. The layer quantity adjusting unit removes at least one layer at the uppermost layer side from the multilayer neural network based on the cost derived by the output from the at least one probing neuron. The layer quantity adjusting unit then sets, as the output layer, the at least one probing neuron in the at least one hidden layer that is located at the uppermost layer side of the remaining layers.

In this configuration, the layer quantity adjusting unit removes at least one unnecessary layer at the uppermost layer side from the multilayer neural network based on the learning process performed by the learning unit. This can reduce an occurrence of increase in processing load and the amount of time required for computation as a result of the number of layers being unnecessarily high. Thus, a multilayer neural network having sufficient generalization capability can be obtained.

In the exemplary embodiment, the learning apparatus may further include a relearning unit that performs a relearning process of the multilayer neural network from which the at least one layer has been removed by the layer quantity adjusting unit. In this configuration, the relearning process is performed after the removal of the at least one unnecessary layer. Therefore, the cost can be further reduced.

In the exemplary embodiment, the layer quantity adjusting unit may further remove at least one layer at the uppermost layer side from the multilayer neural network based on the cost of the at least one probing neuron, for the multilayer neural network that has been relearned by the relearning unit. The layer quantity adjusting unit may set, as the output layer, the at least one probing neuron in the at least one hidden layer that is located at the uppermost layer side of the remaining layers. In this configuration, removal of at least one layer at the uppermost layer side is attempted again after a relearning process performed by the relearning unit. The at least one layer at the uppermost layer side is removed as required. Therefore, the number of layers can be further optimized.

In the exemplary embodiment, the layer quantity adjusting unit may set, as the output layer, the at least one probing neuron of which the cost is the lowest. In this configuration, the cost at the output layer can be minimized and the number of layers can be optimized.

In the exemplary embodiment, when the cost of the output layer in the multilayer neural network is not the lowest, the layer quantity adjusting unit may remove at least one layer at the uppermost layer side of the multilayer neural network so as to keep the at least one probing neuron of the at least one hidden layer at a nearer side to the uppermost layer side compared to the at least one hidden layer that has the at least one probing neuron of which the cost is the lowest. In this configuration, at least one layer is gradually removed from the uppermost layer side. Therefore, the optimal number of layers can be decided based on a plurality of relearning processes.

In the exemplary embodiment, a section connected to the probing neuron may have a layered structure. In this configuration, the section that is connected to the probing neuron has a layered structure. Therefore, discriminative capability of the probing neuron can be improved. Furthermore, there are no limitations to the optimization of the linear separation capability of the hidden layer. Therefore, discriminative capability of the output layer can be also improved.

A second exemplary embodiment of the present disclosure provides a learning system including a first learning apparatus and a second learning apparatus. The first learning apparatus is configured by the learning apparatus of the first exemplary embodiment as described above. The second learning apparatus performs a learning process for a feed-forward multilayer neural network with supervised learning. The second learning apparatus uses, as an initial feed-forward multilayer neural network, the feed-forward multilayer neural network that has been learned by the first learning apparatus from which the at least one probing neuron have been removed. In this configuration, an initial multilayer neural network that has high discriminative capability can be provided.

A third exemplary embodiment of the present disclosure provides a discriminator that performs discrimination using the multilayer neural network obtained by the learning apparatus of the first exemplary embodiment. The discriminator is configured to perform a discrimination process based on the at least one probing neuron of the feed-forward multilayer neural network so as to perform an early rejection process to early reject calculation at each of the units from at least one layer to the uppermost layer side. In this configuration, high-speed discrimination using early rejection can be performed.

In the second exemplary embodiment, early detection may be performed by the probing neurons by determining whether or not there is applicability to any unit in the output layer. In this configuration, whether or not there is applicability to any unit in the output layer can be determined at an early stage. Calculation amount can be reduced.

A fourth exemplary embodiment of the present disclosure includes a learning apparatus that performs a learning process for a feed-forward convolutional neural network with supervised learning.

The convolutional neural network repeatedly performs, for an input image, a convolution process using a filter and a pooling process to reduce a resolution of the input image, and produces compressed information of a convoluted two-dimensional array of a map forming at least one hidden layer, the convolutional neural network including at least one probing neuron connected to the map in the at least one hidden layer The learning apparatus includes a learning unit and a layer quantity adjusting unit. The learning unit performs a learning process by calculation of a cost derived by a cost function defined in the convolutional neural network using a training data set for supervised learning. The layer quantity adjusting unit removes at least one layer at an uppermost layer side from the convolutional neural network based on the cost derived by the output from the at least one probing neuron, and sets, as an output layer for the convolution process, the at least one probing neuron in the at least one hidden layer that is located at the uppermost layer side of the remaining layers.

In this configuration, the layer quantity adjusting unit removes at least one unnecessary layer at the uppermost layer side of the convolutional neural network based on a learning process performed by the learning unit. This can reduce an occurrence of increase in processing load and the amount of time required for computation as a result of the number of layers being unnecessarily high. Thus, a convolutional neural network having sufficient generalization capability can be obtained.

A fifth exemplary embodiment of the present disclosure provides a computer-readable storage medium storing a learning program (instructions) for enabling a computer to function as a learning apparatus that performs a learning process for a feed-forward multilayer neural network with supervised learning.

The feed-forward multilayer neural network includes a plurality of layers configured by: an input layer that is located at a lowermost layer side of a layered structure of the feed-forward multilayer neural network; an output layer that is located at an uppermost layer side of the layered structure; and at least one hidden layer that is located between the input layer and the output layer. Each of the layers includes a given number of units that receive an input from the lowermost layer side, perform a predetermined calculation based on the input and a weight to produce an output, and transfer the output to the uppermost layer side. The at least one hidden layer includes at least one probing neuron that receives an input from the lowermost layer side, performs a predetermined calculation based on the input and a weight to produce an output, but does not transfer the output to the uppermost layer side.

The learning apparatus includes a learning unit and a layer quantity adjusting unit. The learning unit performs a learning process by calculation of a cost derived by a cost function defined in the multilayer neural network using a training data set for supervised learning. The layer quantity adjusting unit removes at least one layer at the uppermost layer side from the multilayer neural network based on the cost derived by the output from the at least one probing neuron, and sets, as the output layer, the at least one probing neuron in the at least one hidden layer that is located further towards the uppermost layer side of the remaining layers.

In this configuration as well, the layer quantity adjusting unit removes at least one unnecessary layer at the uppermost layer side of the multilayer neural network based on the learning process performed by the learning unit. This can reduce an occurrence of increase in processing load and the amount of time required for computation as a result of the number of layers being unnecessarily high. Thus, a multilayer neural network having sufficient generalization capability can be obtained.

A sixth exemplary embodiment of the present disclosure provides a learning method for performing learning of a feed-forward multilayer neural network with supervised learning.

The feed-forward multilayer neural network includes a plurality of layers configured by: an input layer that is located at a lowermost layer side of a layered structure of the feed-forward multilayer neural network; an output layer that is located at an uppermost layer side of the layered structure; and at least one hidden layer that is located between the input layer and the output layer. Each of the layers includes a given number of units that receive an input from the lowermost layer side, perform a predetermined calculation based on the input and a weight to produce an output, and transfer the output to the uppermost layer side. The at least one hidden layer includes at least one probing neuron that receives an input from the lowermost layer side, performs a predetermined calculation based on the input and a weight to produce an output, but does not transfer the output to the uppermost layer side.

The learning method includes: performing, by a learning unit, a learning process by calculation of a cost derived by a cost function defined in the multilayer neural network using a training data set for supervised learning; and removing, by a layer quantity adjusting unit, at least one uppermost layer from the feed-forward multilayer neural network based on the cost derived by the output from the at least one probing neuron, and setting, as the output layer, the at least one probing neuron in the uppermost layer of the remaining layers.

In this configuration as well, at the layer quantity adjusting unit, at least one unnecessary layer from the multilayer neural network is removed based on the learning process performed by the learning unit. This can reduce an occurrence of increase in processing load and the amount of time required for computation as a result of the number of layers being unnecessarily high. Thus, a multilayer neural network having sufficient generalization capability can be obtained.

DESCRIPTION OF THE EMBODIMENTS

A multilayer neural network learning apparatus according to an embodiment of the present invention will hereinafter be described with reference to the drawings. The embodiment described below is an example of when the present invention is carried out. The embodiment described below gives an example when the present invention is carried out. The embodiment does not limit the present invention to specific configurations described hereafter. When carrying out the present invention, specific configurations based on the implementation may be used accordingly.

Figure 1:
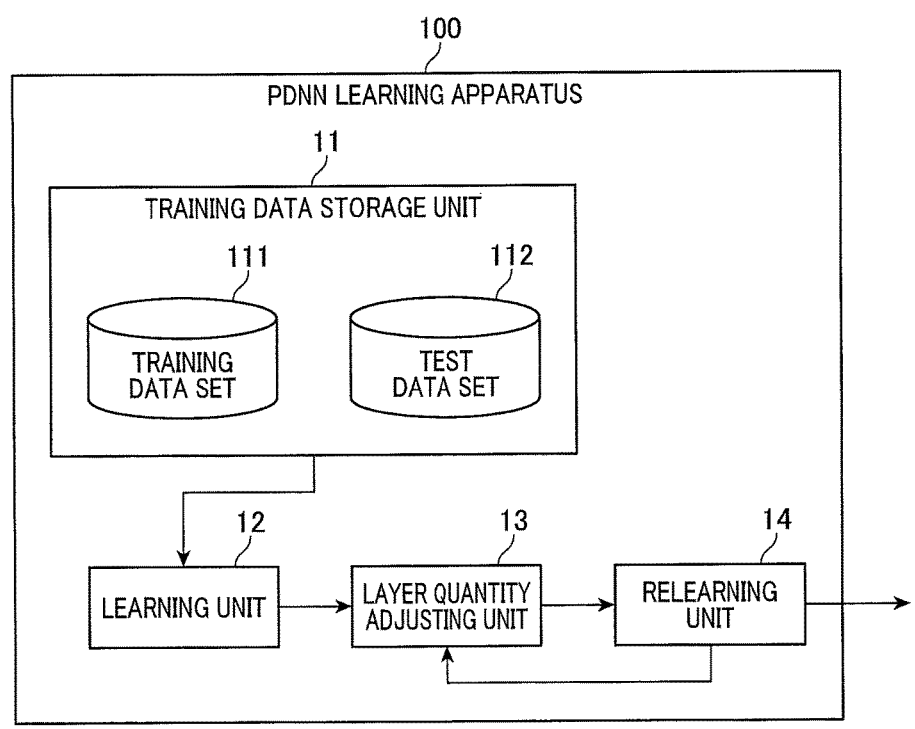
FIG. 1 is a block diagram of a configuration of a multilayer neural network learning apparatus according to an embodiment of the present invention.

FIG. 1 is a block diagram of a configuration of a multilayer neural network learning apparatus according to the present embodiment. The multilayer neural network learning apparatus according to the present embodiment is a learning apparatus for a multilayer neural network to which probing neurons have been added, as described hereafter. The multilayer neural network to which probing neurons have been added is hereinafter referred to as a probed deep neural network (PDNN). A learning apparatus for the PDNN is referred to as a PDNN learning apparatus. In addition, the multilayer neural network may also be referred to, hereafter, as simply a "network".

A PDNN learning apparatus 100 includes a training data storage unit 11, a learning unit 12, a layer quantity adjusting unit 13, and a relearning unit 14. The PDNN learning apparatus 100 is actualized by a computer. The computer includes an auxiliary storage device (such as a hard disk drive (HDD) or a solid-state drive (SSD)), a main storage device (such as a random access memory (RAM)), a processing device (such as a central processing unit (CPU)), an input/output device (various input/output ports and a communication module), and the like. In particular, the training data storage unit 11 is actualized by the auxiliary storage device. The learning unit 12, the layer quantity adjusting unit 13, and the relearning unit 14 are actualized by the computer running a learning program of the present embodiment.

The learning unit 12 performs a learning process by calculating a cost derived by a cost function (also called an objective function, as described later) for a given initial multilayer neural network. In the learning process based on the cost calculation, the cost is minimized such that, when a training data set associated with target values is input to the network, output values of the network approach the target values.

The layer quantity adjusting unit 13 removes at least one layer at the uppermost layer side (hereinafter referred to as "at least one upper layer") of the initial multilayer neural network based on the cost of the initial multilayer neural network calculated by the learning unit 12. The layer quantity adjusting unit 13 thereby adjusts and optimizes the number of layers in the multilayer neural network.

The relearning unit 14 performs relearning of the multilayer neural network of which the number of layers has been optimized by the layer quantity adjusting unit 13. The relearning unit 14 thereby tunes the multilayer neural network. The layer quantity adjusting unit 13 also removes the at least one upper layer of the multilayer neural network that has been adjusted by the relearning unit 14, as required. The layer quantity adjusting unit 13 thereby readjusts and re-optimizes the number of layers in the multilayer neural network.

The training data storage unit 11 stores therein numerous pairs of multidimensional vectors and corresponding target values (multidimensional vectors or scalars) as training data. The multidimensional vector serves as input into the network. The corresponding target value serves as output from the network. The training data is stored in the training data storage unit 11 so as to be divided into a training data set 111 and a test data set 112. The training data set 111 is used to train the network. The test data set 112 is used to evaluate the trained network.

Processes performed by each section of the PDNN learning apparatus 100 will be described. However, first, the types of applicable multilayer neural networks according to the present embodiment will be described. The multilayer neural network of the present embodiment does not include inter-unit connection that straddles a layer. In addition, all units of a certain layer and all units of the next layer may be connected. Alternatively, some units may not be connected. The applicable network is a feed-forward type in which signals are sequentially propagated from an input layer to an output layer via at least one hidden layers.

Figure 2:
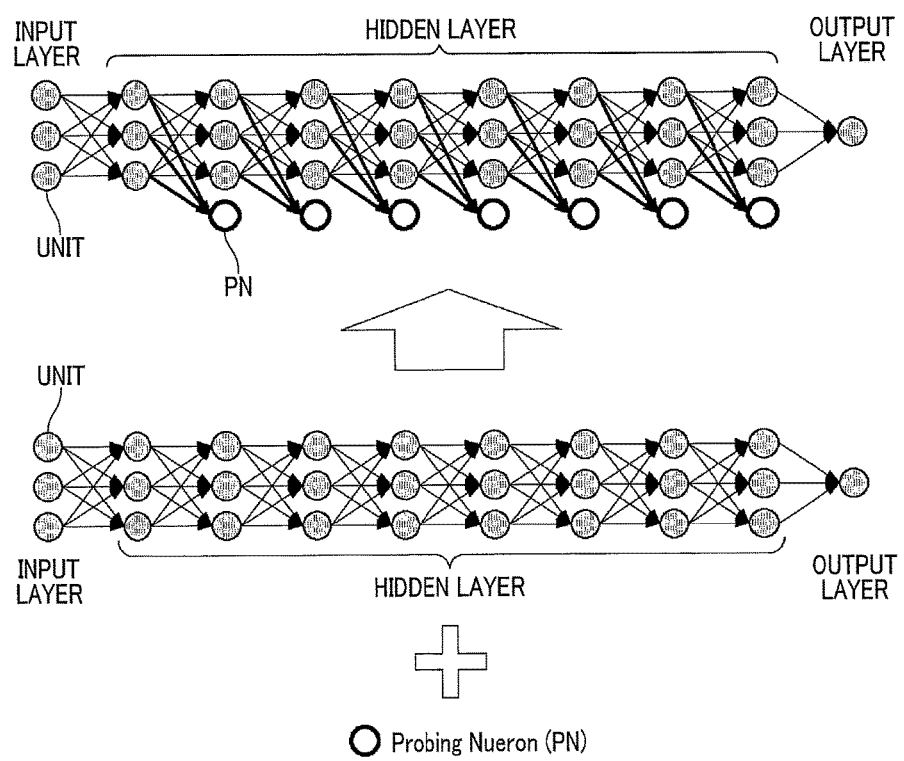
FIG. 2 is a diagram of a configuration of an initial multilayer neural network according to the embodiment.

FIG. 2 is a diagram of a configuration of an initial multilayer neural network of the present embodiment in comparison with a conventional multilayer neural network. The upper portion of FIG. 2 is an example of the initial multilayer neural network of the present embodiment, and the lower portion is a conventional multilayer neural network. As shown in FIG. 2, the initial multilayer neural network has a network structure in which at least one unit acting as at a probing neuron (PN) is added to the conventional multilayer neural network. The PN is a unit that belongs to the hidden layer and is trained so that the output value becomes closer to the target value.

The multilayer neural network has a plurality of layers configured by an input layer that is a lowermost layer, an output layer that is an uppermost layer, and at least one hidden layer that is located between the input layer and the output layer. Each of layers includes a given number of units (also called neurons or processing elements in the multilayer neural network) that receive an input from the lowermost layer side, perform a predetermined calculation based on the input and a weight to produce an output, and transfer the output to the uppermost layer side.

In the present embodiment, the hidden layer includes one PN that receives an input from the lowermost layer side, performs a predetermined calculation based on the input and a weight to produce an output, but does not transfer the output to the uppermost layer side.

Figure 3:
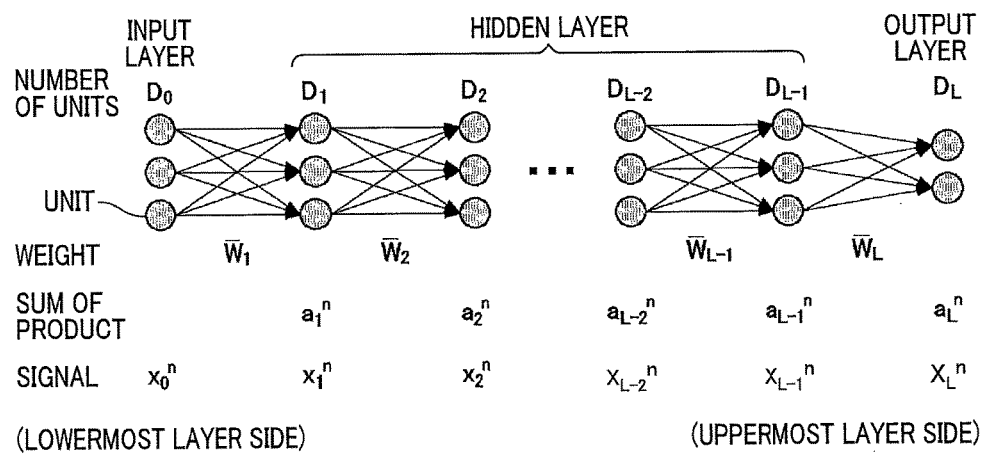
FIG. 3 is a diagram of a structure of a conventional multilayer neural network.
Figure 4:
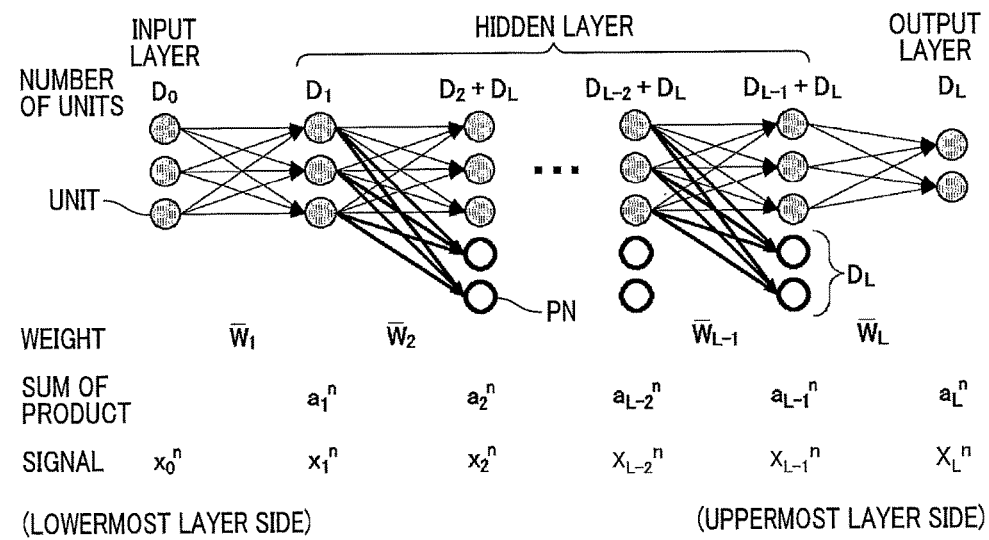
FIG. 4 is a diagram of a structure of the initial multilayer neural network according to the embodiment.

First, a learning method of a conventional multilayer neural network will be described below. Thereafter, a PDNN learning method by the PDNN learning apparatus 100 according to the present embodiment will be described. FIG. 3 is a diagram of a structure of the conventional multilayer neural network. In FIG. 3, L denotes the number of layers excluding the input layer, and $D_l$ ($l=0, 1, 2, \ldots, L-2, L-1, L$) denotes the number of units in each layer are provided in advance. Here, the input layer has $D_0$ unit. The hidden layer is made of first to $L-1$-th layers that respectively have $D_1$ to $D_{L-1}$ units. The output layer is made of $L$-th layer (last layer) that has $D_L$. In the present embodiment, $D_0=3, D_2=3, \ldots, D_{L-2}=3, D_{L-1}=3, D_L=2$, as shown in FIGS. 3 and 4.

An n-th ($n=1, 2, \ldots, N$) input vector serving as input into the $D_0$ units of the input layer is defined as in the following expressions (1) and (2).

$$x_0^n \in \mathbb{R}^{D_0} \tag{1}$$

$$\bar{x}_0^n = [1 | x_0^{nT}]^T \tag{2}$$

For all $l=1, 2, \ldots, L$, the variables in the following expressions (3) to (7) are determined.

$$W_l \in \mathbb{R}^{D_l \times D_{l-1}} \tag{3}$$

$$\bar{W}_l = [b_l | W_l], b_l \in \mathbb{R}^{D_l} \tag{4}$$

$$a_l^n = \bar{W}_l \bar{x}_{l-1}^n \tag{5}$$

$$x_l^n = h(a_l^n) \forall l=1, 2, \ldots, L-1$$

$$x_L^n = a_L^n \tag{6}$$

$$\bar{x}_l^n = [1 | x_l^{nT}]^T \tag{7}$$

Here, h is a monotonically increasing, differentiable non-linear activation function.

The following weights, given in the $D_l$ ($l=1, 2, \ldots, L$) units of the hidden layers (first to $L-1$-th layers) and the output layer (L-th layer) are determined in such a manner as to minimize a cost E expressed by the following expression (8) as an optimization problem:

$$\bar{W}_1, \bar{W}_2, \ldots, \bar{W}_L \tag{8}$$

$$E(\bar{W}_1, \bar{W}_2, \ldots, \bar{W}_L) = \sum_{n=1}^{N} E^n(\bar{W}_1, \bar{W}_2, \ldots, \bar{W}_L)$$

$$E^n = \frac{1}{2}\|x_L^n - t^n\|_2^2$$

wherein $t^n$ is a known correct answer output vector (scalar) of dimension $D_L$. $E^n$ may be the total sum of the square of the difference with a true value. Alternatively, cross entropy may be used.

An error back propagation method is used for the learning process. In the error back propagation method, update based on a gradient method is repeatedly performed in sequence from the weight closest to the output layer. The initial value at this time is provided by a random number. The gradient method is expressed by the following expression (9).

$$\overline{W}_l \rightarrow \overline{W}_l - \epsilon \frac{\partial E}{\partial \overline{W}_l}, \epsilon \ll 1 \tag{9}$$

A method for calculating the derivative used in the gradient method is as follows. Subscripts i, j, and k in the following expressions represent vector and matrix indexes.

First, the derivative with respect to a weight given in the $D_l$ (l=L) units of the output layer (L-th layer) is determined by calculation of the following expressions (10) to (12).

$$\frac{\partial E_L^n}{\partial \overline{W}_{Lij}} = \sum_{k=1}^{D_L} \Delta_{L_k}^n \frac{\partial a_{L_k}^n}{\partial \overline{W}_{Lij}} \tag{10}$$

$$\begin{cases} \frac{\partial a_{L_k}^n}{\partial \overline{W}_{Lij}} = \delta_{ki} \overline{x}_{L-1_j}^n \tag{11} \\ \Delta_{L_k}^n \equiv \frac{\partial E^n}{\partial a_{L_k}^n} = (a_L^n - t^n)_k \tag{12} \end{cases}$$

The derivatives with respect to the weights given in the $D_l$ (l=L−1, L−2, . . . , 1) units of the L−1-th, L−2-th, . . . , first layers (hidden layers) are determined by calculation of the following expressions (13) to (16).

$$\frac{\partial E^n}{\partial \overline{W}_{lij}} = \sum_{k=1}^{D_l} \Delta_{l_k}^n \frac{\partial a_{l_k}^n}{\partial \overline{W}_{lij}} \tag{13}$$

$$\begin{cases} \frac{\partial a_{l_k}^n}{\partial \overline{W}_{lij}} = \delta_{ki} \overline{x}_{l-1_j}^n \tag{14} \\ \Delta_{l_k}^n \equiv \frac{\partial E^n}{\partial a_{l_k}^n} = \sum_{j=1}^{D_{l+1}} \frac{\partial E^n}{\partial a_{l+1_j}^n} \frac{\partial a_{l+1_j}^n}{\partial a_{l_k}^n} = \sum_{j=1}^{D_{l+1}} \Delta_{l+1_j}^n \frac{\partial a_{l+1_j}^n}{\partial a_{l_k}^n} \tag{15} \\ \frac{\partial a_{l+1_j}^n}{\partial a_{l_k}^n} = W_{l+1_{jk}} h'(a_l^n)_k \tag{16} \end{cases}$$

Next, the PDNN learning method according to the present embodiment will be described. In the PDNN learning method, first, a PDNN having a sufficient number of layers is set as an initial network. Then, the PDNN learning apparatus 100 decides the optimal number of layers based on the following procedure.

FIG. 4 is a diagram of a structure of an initial network of the PDNN. The number of layers (hidden layers) L and the number of units $D_l$ (l=1, 2, . . . , L) in each layer are provided in advance. In addition, the number of PN disposed in each hidden layer is the same as the number of units of the output layer ($D_L$=2). The n-th (n=1, N) input vector of the training data set 111 is defined as in the following expressions (17) and (18).

$$x_0^n \in \mathbb{R}^{D_0} \tag{17}$$

$$\overline{x}_0^n = [1 | x_0^{nT}]^T \tag{18}$$

For l=1, the variables in the following expressions (19) to (23) are determined.

$$W_1 \in \mathbb{R}^{D_1 \times D_0} \tag{19}$$

$$\overline{W}_1 = [b_1 | W_1], b_1 \in \mathbb{R}^{D_1} \tag{20}$$

$$a_1^n = \overline{W}_1 \overline{x}_0^n \tag{21}$$

$$x_1^n = h(a_1^n) \tag{22}$$

$$\overline{x}_1^n = [1 | x_1^{nT}]^T \tag{23}$$

For l=2, 3, . . . , L−1, the variables in the following expressions (24) to (28) are determined.

$$W_l \in \mathbb{R}^{(D_l + D_L) \times D_{l-1}} \tag{24}$$

$$\overline{W}_l = [b_l | W_l], b_l \in \mathbb{R}^{D_l + D_L} \tag{25}$$

$$a_{l_i}^n = \sum_{j=1}^{D_{l-1}} \overline{W}_{l_{ij}} \overline{x}_{l-1_j}^n \tag{26}$$

$$x_l^n = h(a_l^n) \tag{27}$$

$$\overline{x}_l^n = [1 | x_l^{nT}]^T \tag{28}$$

The variable of the uppermost layer (l=L) is determined as follows.

$$W_L \in \mathbb{R}^{D_L \times D_{L-1}} \tag{29}$$

$$\overline{W}_L = [b_L | W_L], b_L \in \mathbb{R}^{D_L} \tag{30}$$

$$a_{L_i}^n = \sum_{j=1}^{D_{L-1}} \overline{W}_{L_{ij}} \overline{x}_{L-1_j}^n \tag{31}$$

$$x_L^n = h(a_L^n) \tag{32}$$

The learning unit 12 determines the following weights, given in the $D_l$ (l=1, 2, . . . , L) units of the output layer (first to L−1-th layers) and the output layer (L-th layer) in such a manner as to minimize a cost E expressed by the following expression (33) as an optimization problem.

$$\begin{aligned} &\overline{W}_1, \overline{W}_2, \ldots, \overline{W}_L \\ &E(\overline{W}_1, \overline{W}_2, \ldots, \overline{W}_L) = \sum_{n=1}^{N} E^n(\overline{W}_{1_{[1,D_1]}}, \overline{W}_{2_{[1,D_2]}}, \ldots, \overline{W}_L) \\ &\quad + E^n(\overline{W}_{1_{[1,D_1]}}, \overline{W}_{2_{[1,D_2]}}, \ldots, \overline{W}_{L-1_{[D_{L-1}+1, D_{L-1}+D_L]}}) \\ &\quad + E^n(\overline{W}_{1_{[1,D_1]}}, \overline{W}_{2_{[1,D_2]}}, \ldots, \overline{W}_{L-2_{[D_{L-2}+1, D_{L-2}+D_L]}}) \\ &\quad + \ldots + E^n(\overline{W}_{1_{[1,D_1]}}, \overline{W}_{2_{[D_2+1, D_2+D_L]}}) \end{aligned} \tag{33}$$

$$\begin{cases} E^n(\overline{W}_{1[1,D_1]}, \overline{W}_{2[1,D_2]}, \ldots, \overline{W}_L) = \frac{1}{2}\sum_{i=1}^{D_L}(x_L^n{}_i - t^n{}_i)^2 & (34) \\ E^n(\overline{W}_{1[1,D_1]}, \overline{W}_{2[1,D_2]}, \ldots, \overline{W}_{l[D_l+1,D_l+D_L]}) = \frac{1}{2}\sum_{i=1}^{D_L}(x_l^n{}_{D_l+i} - t^n{}_i)^2 & (35) \\ \forall l = 1, 2, \ldots, L-1 \\ \text{Matrix A} \\ A_{[c_1,c_2]} = \text{Matrix composed of } c_1\text{-th row to } c_2\text{-th row of the matrix A} & (36) \end{cases}$$

In the expression (33), the first term on the right-hand side indicates the cost of the output layer (L-th layer). The second term on the right-hand side indicates the cost the PN of the L−1-th layer. The third term on the right-hand side indicates the cost of the PN of the L−2-th layer. The last term on the right-hand side indicates the cost of the PN of the second layer.

For the hidden layers, the total sum of the square of the difference between the PN and a true value may be used as the PN cost. For the output layer, cross entropy may be used as the cost instead of the squared sum, as in an ordinary neural network. Hereafter, the notations are simplified as in the following expressions (37) and (38).

$$E_l^n = E^n(\overline{W}_1, \overline{W}_2, \ldots, \overline{W}_{l[D_l+1,D_l+D_L]}), l = 2, 3, \ldots, L-1 \quad (37)$$

$$E_L^n = E^n(\overline{W}_1, \overline{W}_2, \ldots, \overline{W}_L) \quad (38)$$

A learning process is performed by applying update rules for weights based on the gradient method, in a manner similar to the ordinary neural network. First, the derivative with respect to the weights given in the $D_L$ units of the uppermost layer (L-th layer) is determined by calculation of the following expressions (39) to (41), when l=L.

$$\frac{\partial E_L^n}{\partial \overline{W}_{Lij}} = \sum_{k=1}^{D_L} \Delta_{L_k}^n \frac{\partial a_{L_k}^n}{\partial \overline{W}_{Lij}} \quad (39)$$

$$\begin{cases} \frac{\partial a_{L_k}^n}{\partial \overline{W}_{Lij}} = \delta_{ki} \overline{x}_{L-1j}^n & (40) \\ \Delta_{L_k}^n \equiv \frac{\partial E^n}{\partial a_{L_k}^n} = (a_L^n - t^n)_k & (41) \end{cases}$$

In addition, the derivative with respect to the weights given in the $D_{L-1}$ units of the L−1-th layer that is one layer before the L-th layer (uppermost layer) is determined by calculation of the following expressions (42) to (48), when l=L−1.

$$\forall i = D_l + 1, D_l + 2, \ldots, D_l + D_L, \quad (42)$$

$$\frac{\partial E_l^n}{\partial \overline{W}_{lij}} = \sum_{k=D_l+1}^{D_l+D_L} \Delta_{l_k}^n \frac{\partial a_{l_k}^n}{\partial \overline{W}_{lij}}$$

$$\forall k = D_l + 1, D_l + 2, \ldots, D_l + D_L$$

$$\begin{cases} \frac{\partial a_{l_k}^n}{\partial \overline{W}_{lij}} = \delta_{ki} \overline{x}_{l-1j}^n & (43) \\ \Delta_{l_k}^n \equiv \frac{\partial E_l^n}{\partial a_{l_k}^n} = h'(a_l^n)_k (h(a_l^n) - t^n)_k & (44) \end{cases}$$

$$\forall i = 1, 2, \ldots, D_l, \frac{\partial E_{l+1}^n}{\partial \overline{W}_{lij}} = \sum_{k=1}^{D_l} \Delta_{l_k}^n \frac{\partial a_{l_k}^n}{\partial \overline{W}_{lij}} \quad (45)$$

$$\forall k = 1, 2, \ldots, D_l$$

$$\begin{cases} \frac{\partial a_{l_k}^n}{\partial \overline{W}_{lij}} = \delta_{ki} \overline{x}_{l-1j}^n & (46) \\ \Delta_{l_k}^n \equiv \frac{\partial E_{l+1}^n}{\partial a_{l_k}^n} = \sum_{j=1}^{D_{l+1}} \frac{\partial E_{l+1}^n}{\partial a_{l+1j}^n} \frac{\partial a_{l+1j}^n}{\partial a_{l_k}^n} = \sum_{j=1}^{D_{l+1}} \Delta_{l+1j}^n \frac{\partial a_{l+1j}^n}{\partial a_{l_k}^n} & (47) \\ \frac{\partial a_{l+1j}^n}{\partial a_{l_k}^n} = W_{l+1jk} h'(a_l^n)_k & (48) \end{cases}$$

Here, the expression (41) shows the derivative with respect to the weights that are directly connected to the PN. The expression (45) shows the derivative with respect to the weights that are not directly connected to the PN.

The derivative with respect to the weights given in the $D_{L-2}$ units of the L−2-th layer that is two layers before the L-th layer (uppermost layer) is determined by calculation of the following expressions (49) to (55), when l=L−2.

$$\forall i = D_l + 1, D_l + 2, \ldots, D_l + D_L, \quad (49)$$

$$\frac{\partial E_l^n}{\partial \overline{W}_{lij}} = \sum_{k=D_l+1}^{D_l+D_L} \Delta_{l_k}^n \frac{\partial a_{l_k}^n}{\partial \overline{W}_{lij}}$$

$$\forall k = D_l + 1, D_l + 2, \ldots, D_l + D_L$$

$$\begin{cases} \frac{\partial a_{l_k}^n}{\partial \overline{W}_{lij}} = \delta_{ki} \overline{x}_{l-1j}^n & (50) \\ \Delta_{l_k}^n \equiv \frac{\partial E_l^n}{\partial a_{l_k}^n} = h'(a_l^n)_k (h(a_l^n) - t^n)_k & (51) \end{cases}$$

$$\forall i = 1, 2, \ldots, D_l, \frac{\partial E_{l+2}^n}{\partial \overline{W}_{lij}} + \frac{\partial E_{l+1}^n}{\partial \overline{W}_{lij}} = \sum_{k=1}^{D_l} \Delta_{l_k}^n \frac{\partial a_{l_k}^n}{\partial \overline{W}_{lij}} \quad (52)$$

$$\forall k = 1, 2, \ldots, D_l$$

$$\begin{cases} \frac{\partial a_{l_k}^n}{\partial \overline{W}_{lij}} = \delta_{ki} \overline{x}_{l-1j}^n & (53) \\ \Delta_{l_k}^n \equiv \frac{\partial E_{l+2}^n}{\partial a_{l_k}^n} + \frac{\partial E_{l+1}^n}{\partial a_{l_k}^n} & (54) \\ = \sum_{j=1}^{D_{l+1}} \frac{\partial E_{l+2}^n}{\partial a_{l+1j}^n} \frac{\partial a_{l+1j}^n}{\partial a_{l_k}^n} + \sum_{j=D_{l+1}+1}^{D_{l+1}+D_L} \frac{\partial E_{l+1}^n}{\partial a_{l+1j}^n} \frac{\partial a_{l+1j}^n}{\partial a_{l_k}^n} \\ = \sum_{j=1}^{D_{l+1}+D_L} \Delta_{l+1j}^n \frac{\partial a_{l+1j}^n}{\partial a_{l_k}^n} \\ \frac{\partial a_{l+1j}^n}{\partial a_{l_k}^n} = W_{l+1jk} h'(a_l^n)_k & (55) \end{cases}$$

From the above-described derivation, update rules can be generalized as follows when l=L−1, L−2, . . . , 2.

$$\forall\, i = 1, 2, \ldots, D_l, +D_L, \quad \frac{\partial E}{\partial \overline{W}_{l_{ij}}} = \sum_{n=1}^{N} \Delta_{l_i}^n \overline{x}_{l-1_j}^n \tag{56}$$

$$\Delta_{l_k}^n = \tag{57}$$

$$\begin{cases} \sum_{j=1}^{D_{l+1}+D_L} \Delta_{l+1_j}^n W_{l+1_{jk}} h'(a_l^n)_k, & \forall\, k = 1, 2, \ldots, D_l \\ h'(a_l^n)_k (h(a_l^n) - t^n)_k, & \forall\, k = D_l+1, D_l+2, \ldots, D_l+D_L \end{cases}$$

The following can be used when l=1.

$$\Delta_{1_k}^n = \sum_{j=1}^{D_2+D_L} \Delta_{2_j}^n W_{2_{jk}} h'(a_1^n)_k \tag{58}$$

Next, a process performed by the layer quantity adjusting unit 13 will be described. The learning unit 12 minimizes cost E through learning, in the manner described above.

When the following weights that minimize the cost E are determined as described above, the layer quantity adjusting unit 13 removes at least one layer at the uppermost layer side from the network based on the cost E.

$$\overline{W}_1, \overline{W}_2, \ldots, \overline{W}_L$$

Figure 5:
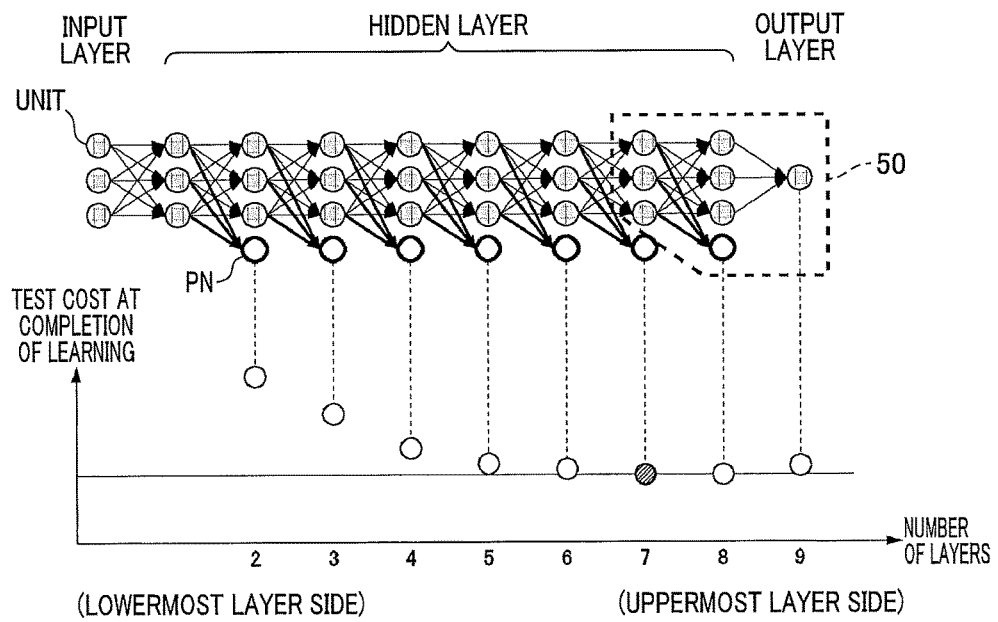
FIG. 5 is a diagram of a relationship between the number of layers and test cost after completion of learning according to the embodiment.

FIG. 5 is a diagram of a relationship between the number of layers and the test cost at the completion of learning. The test cost in FIG. 5 refers to the cost E of the PN when the expression (33) is calculated using the test data set 112. The value of the test cost is preferably small. For simplicity, the number of units in the output layer and the number of PN in each hidden layer are both one in the example in FIG. 5.

The PN of the network obtained through learning by the learning unit 12 is trained so that the value of each PN becomes closer to the target value. Therefore, the PN can be considered to be a discriminator in a manner similar to the unit in the output layer. As a result of the learning unit 12 learning the initial network, the value of the cost of each PN can be obtained as in FIG. 5. When the number of layers in relation to the test data is too large, overlearning occurs in the PN. When the number of layers is too small, the PN does not have sufficient discriminative capability. Therefore, the layer at which the cost of the PN is the lowest value is the most favorable layer. In the example in FIG. 5, the cost of the PN is the lowest value at the 7th layer.

The layer quantity adjusting unit 13 counts the number of the layers. Calculation is not required for the layers that follow the layer at which the cost of the PN is the lowest (most favorable) because the overall discriminative capability will not be improved. Therefore, the layer quantity adjusting unit 13 removes a portion 50 encircled by the dotted line in FIG. 5 from the network. In other words, the layer quantity adjusting unit 13 removes the PN of layers higher than the PN of which the cost is the lowest. The layer quantity adjusting unit 13 also removes the weights connected to the PN (all weights of the layer before the PN).

Figure 6:
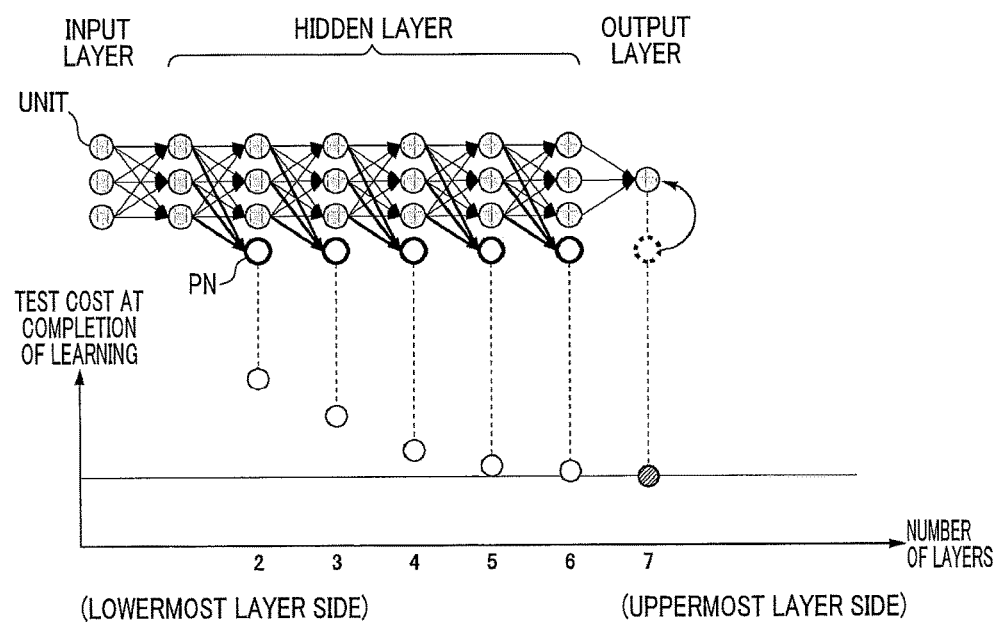
FIG. 6 is a diagram of a multilayer neural network after layers have been removed according to the embodiment.

FIG. 6 is a diagram of a network after the layers have been removed. As shown in FIG. 6, the PN of the 7th layer becomes the unit of the output layer. Removal of at least one unnecessary layer at the uppermost layer side from the network does not change the signals of the remaining network in any way. Therefore, the cost of the PN also remains unchanged. This means that the removal of at least one unnecessary layer at the uppermost layer side by the layer quantity adjusting unit 13 does not degrade discriminative capability in any way.

Figure 7:
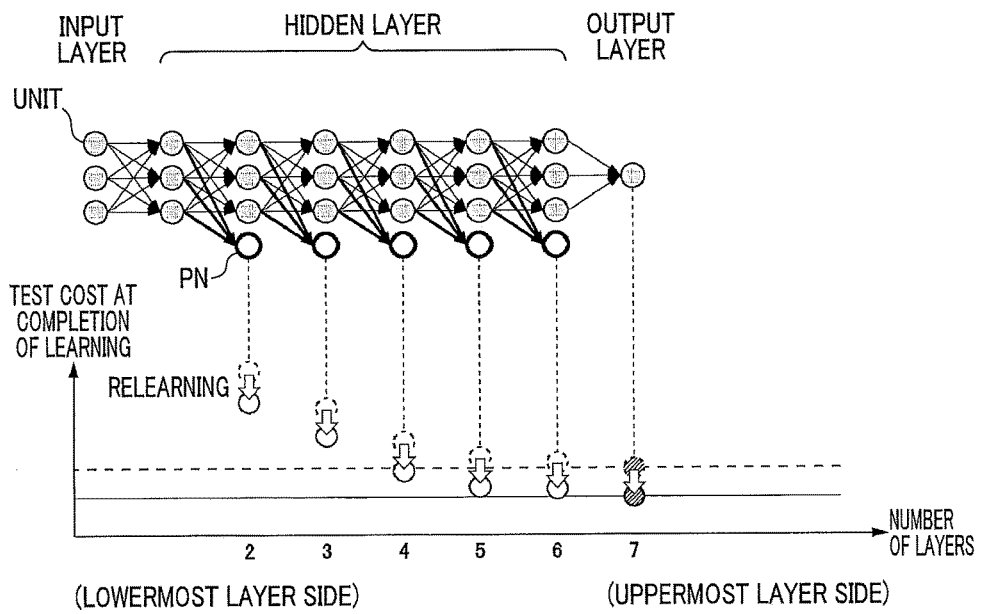
FIG. 7 is a diagram for explaining a process performed by a relearning unit according to the embodiment.

Next, a process performed by the relearning unit 14 will be described. The relearning unit 14 performs the above-described learning (hereinafter also referred to as "fine-tuning") again on the network from which the at least one layer at the uppermost layer side have been removed by the layer quantity adjusting unit 13. FIG. 7 is a diagram for describing the process performed by the relearning unit 14. The network from which the at least one unnecessary layer at the uppermost layer side has been removed by the layer quantity adjusting unit 13 can be reduced in cost by further learning. Learning herein means performing updates based on the error back propagation method, from the values of the weights that are currently held. Back propagation of errors from the uppermost layer side to the lowermost layer side does not occur in the network from which unnecessary layers have been removed. Therefore, the update amount changes, and cost can be further reduced.

The network and the weights obtained as a result of relearning often exhibit higher generalization capability, compared to the learning results of the initial network. A reason for this is considered to be as follows. The PN is disposed in each hidden layer. The linear separation capability of each hidden layer is optimized. As a result, signals from the hidden layers are prevented from having unnecessarily complex expressions for classification of data. Excessive adaptation to training data is prevented.

The relearning unit 14 performs a relearning process and calculates the cost. As a result, cost is reduced. However, at this time, the cost of the uppermost layer (the output layer) does not necessarily become the lowest. For example, as a result of relearning, the cost may become the lowest at an upper layer (hidden layer) before the uppermost layer. Therefore, when the cost does not become the lowest at the uppermost layer, the layer quantity adjusting unit 13 removes the at least one layer above the upper layer at which the cost is the lowest.

When the high-order layers are removed by the layer quantity adjusting unit 13, the relearning unit 14 performs relearning of the network as such. The removal of unnecessary layers by the layer quantity adjusting unit 13 and relearning by the relearning unit 14 such as this are repeated until unnecessary layers no longer appear. When unnecessary layers no longer appear, the PDNN learning apparatus 100 outputs the PDNN as the final result.

Figure 8:
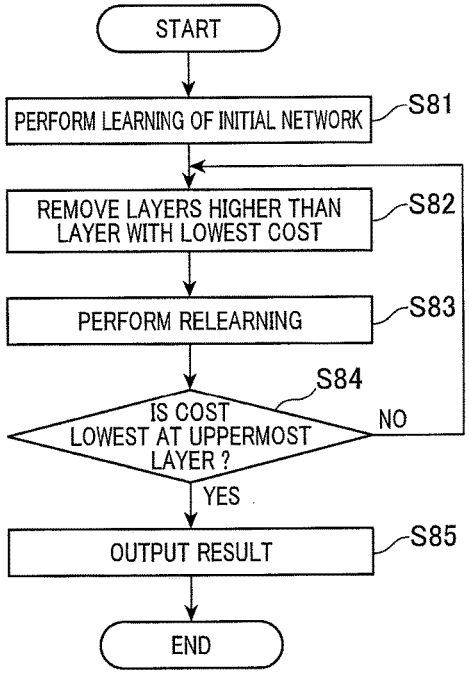
FIG. 8 is a flowchart of a learning method of the multilayer neural network learning apparatus according to the embodiment.

FIG. 8 is a flowchart of the PDNN learning method of the PDNN learning apparatus according to the present embodiment. First, the learning unit 12 performs a learning process based on cost calculation of the initial network (step S81). Next, the layer quantity adjusting unit 13 removes layers higher than the layer at which the cost is the lowest. The layer quantity adjusting unit 13 sets the PN of the remaining uppermost layer, or in other words, the PN of which the cost is the lowest as the output layer (step S82). Next, the relearning unit 14 performs a relearning process of the network composed of remaining layers (step S83).

The layer quantity adjusting unit 13 determines whether or not the cost of the uppermost layer remains the lowest as a result of relearning (step S84). When determined that the cost of the uppermost layer is not the lowest (NO at step S84), the layer quantity adjusting unit 13 removes the layers higher than the layer of which the cost is the lowest (step S82). The relearning layer 14 then performs a relearning process of the network such as this (step S83). Steps S82 to S84 are repeatedly performed. When the cost of the uppermost layer becomes the lowest at step S84 (YES at step S84), the layer quantity adjusting unit 13 outputs the result (step S85).

As described above, in the PDNN learning apparatus 100 according to the present embodiment; the layer quantity adjusting unit 13 removes unnecessary high-order layers of the PDNN based on the learning process by the learning unit 12. Therefore, increase in processing load and the amount of time required for computation as a result of the number of layers being unnecessarily high does not occur. A multilayer neural network having sufficient generalization capability can be obtained.

In addition, in the PDNN apparatus 100 according to the present embodiment, the learning process for the purpose of reducing cost is performed through the relearning process after the removal of unnecessary high-order layers from the PDNN. Therefore, cost can be further reduced. Moreover, removal of high-order layers is attempted again after the relearning process. High-order layers are removed if possible. A relearning process is performed again. This is repeated as long as the removal of high-order layers is effective. Therefore, cost can be further reduced. A network having high generalization capability can be constructed.

Variation examples of the above-described embodiment are described below.

First Variation Example

According to the above-described embodiment, the layer quantity adjusting unit 13 removes the units in the high-order layers while leaving the number of layers at which the cost calculated as a result of the learning process by the learning unit 12 is the lowest. However, as a result of the relearning process by the relearning unit 14, the cost may become the lowest at a layer higher than the uppermost layer (the seventh layer in FIG. 5) of the remaining layers.

Therefore, in the PDNN learning apparatus of the present variation example, when the cost of the uppermost layer (output layer) is not the lowest, the layer quantity adjusting unit 13 does not immediately remove all layers higher than the layer at which the cost calculated as a result of the learning process by the learning unit 12 is the lowest. Rather, the layer quantity adjusting unit 13 removes the high-order layers so that at least one PN of the layers higher the layer that has the PN of which the cost is the lowest remains. Specifically, when the cost of the uppermost layer is not the lowest, the layer quantity adjusting unit 13 removes the layers one at a time, from the uppermost layer.

When the layer quantity adjusting unit 13 removes the single uppermost layer, the relearning unit 14 performs a relearning process of the network from which the uppermost layer has been removed and calculates the cost. As a result, when the cost of the uppermost layer is not the lowest, the layer quantity adjusting unit 13 removes the single uppermost layer again. The relearning unit 14 performs a relearning process of the network such as this. In this way, removal of the uppermost layer and relearning are repeated until the cost of the uppermost layer is the lowest.

As described above, in the present variation example, the layer quantity adjusting unit 13 does not immediately remove all layers determined to be unnecessary based on learning and cost calculation. Rather, the layer quantity adjusting unit 13 removes the single uppermost layer, one at a time. The relearning unit 14 performs relearning every time a layer is removed.

Figure 9:
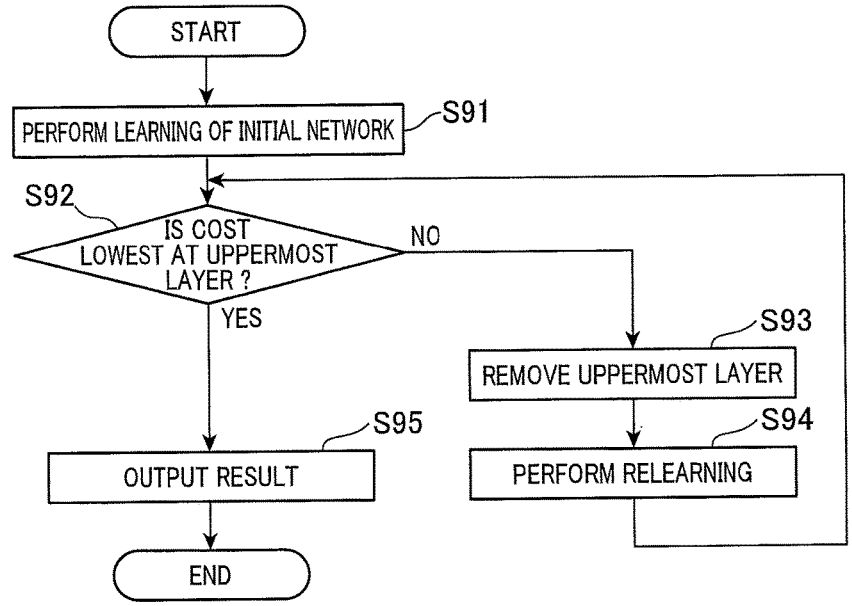
FIG. 9 is a flowchart of a PDNN learning method of the multilayer neural network learning apparatus in a first variation example according to the embodiment.

FIG. 9 is a flowchart of the PDNN learning method of the PDNN learning apparatus in the variation example. First, in a manner similar to that according to the above-described embodiment, the learning unit 12 performs learning by cost calculation of the initial network (step S91). Next, the layer quantity adjusting unit 13 determines whether or not the cost at the uppermost layer is the lowest based on the result of cost calculation (step S92). When determined that the cost at the uppermost layer is not the lowest (NO at step S92), the layer quantity adjusting unit 13 removes the uppermost layer (step S93). When the uppermost layer is removed, the relearning unit 14 performs relearning of the network such as this and calculates the cost (step S94).

Based on the result of relearning by the relearning unit 14, the layer quantity adjusting unit 13 determines again whether or not the cost at the uppermost layer is the lowest (step S92). Step S92 to Step S94 are repeated until the cost at the uppermost layer is lowest. At step S92, when determined that the cost at the uppermost layer is the lowest (YES at step S92), the layer quantity adjusting unit 13 outputs the network (step S95).

In other words, when the cost of the PN at the uppermost layer (the cost of the ninth layer in the example in FIG. 5) is not the lowest, the layer quantity adjusting unit 13 removes the high-order layer (units other than the PN of the 8th layer and the 9th layer in the example in FIG. 5) so that at least one PN (the PN of the 8th layer in the example in FIG. 5) of the layers higher than the layer that has the PN of which the cost is the lowest (the 7th layer in the example in FIG. 5) remains. In this way, in the present variation example, the layers are removed one at a time. Therefore, the optimal number of layers can be decided by a plurality of relearning operations.

Second Variation Example

Figure 10:
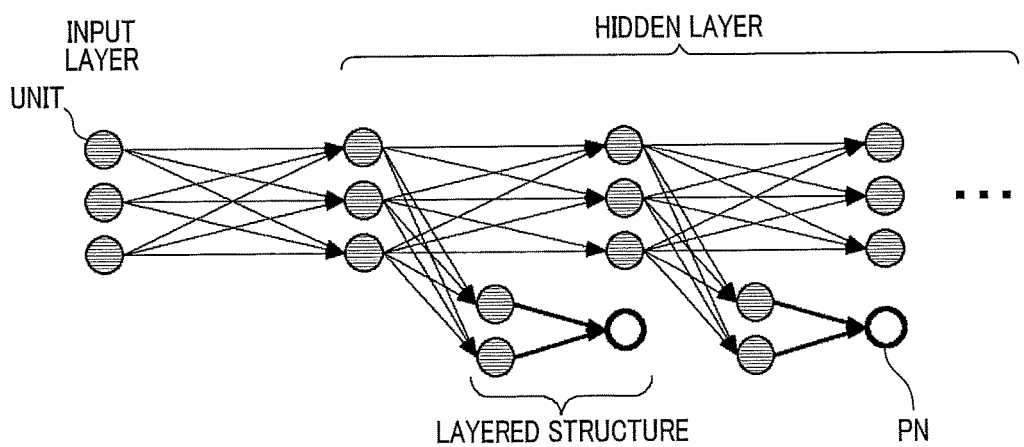
FIG. 10 is a diagram of a structure of the multilayer neural network in a second variation example according to the embodiment.

Next, as a second variation example, an instance in which a section that does not feed-forward to the output layer has a layered structure will be described. FIG. 10 is a diagram of a network structure of the present variation example. As shown in FIG. 10, the number of units in each layer is three. However, the value of the PN is not directly obtained from the three units. A plurality of units (neurons) are passed through before the value of the PN is obtained. The value of the PN is calculated from these units.

In the present variation example as well, in a manner similar to that according to the above-described embodiment, the number of layers can be reduced based on the discriminative capability of the PN. In addition, the section connected to the PN has a layered structure. Therefore, it is thought that the discriminative capability of the PN can be improved. Furthermore, in the present variation example, there are no limitations to the optimization of the linear separation capability of each hidden layer. Therefore, improvement in the discriminative capability of the output layer can also be expected.

Application examples of the PDNN learning apparatus according to the present embodiment and the variation examples will be described.

First Application Example

Figure 11:
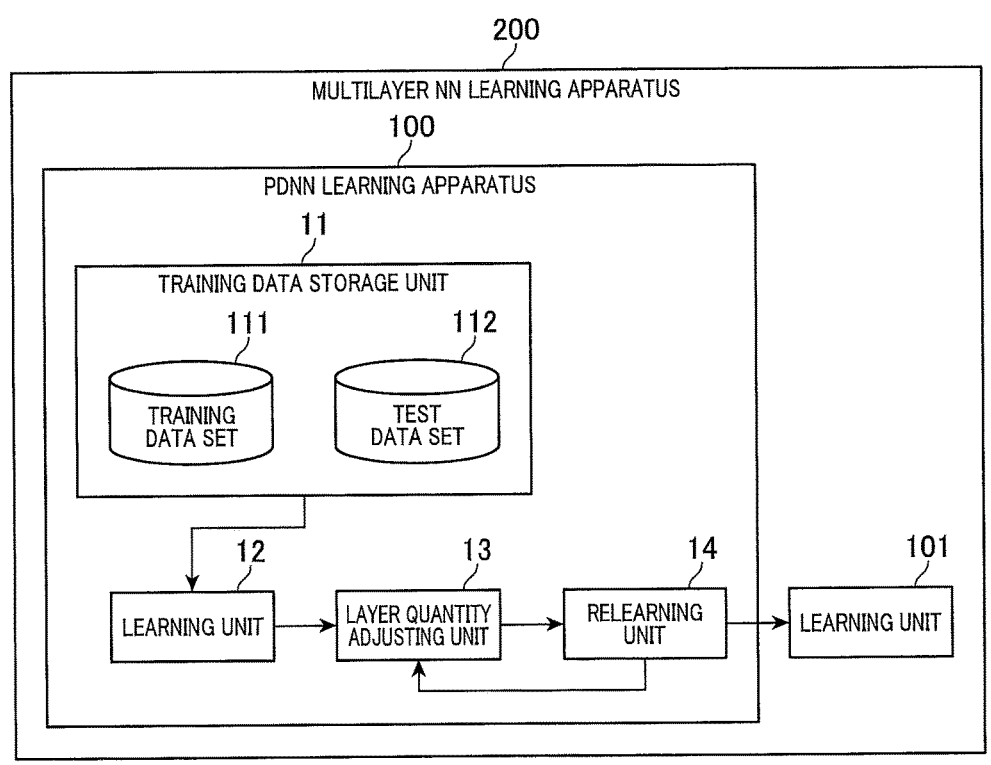
FIG. 11 is a block diagram of a configuration of the multilayer neural network learning apparatus in a first application example according to the embodiment.

FIG. 11 is a block diagram of a configuration of a multilayer neural network in a first application example. As shown in FIG. 11, a multilayer neural network learning apparatus 200 includes the PDNN learning apparatus 100 according to the present embodiment and a learning unit 101 of an ordinary multilayer neural network that does not have PN. The learning unit 102 performs a learning process of the multilayer neural network by a learning method similar to the conventional method. The PDNN learning apparatus 100 provides the learning unit 101 with the result of the learning process (the values of the weights remaining after removal) of the PDNN as the initial values.

In the PDNN, the linear separation capability of each hidden layer is optimized. Therefore, the PDNN has an advantage in that a nonlinear internal representation is not excessively generated. On the other hand, the role of each unit significantly differs in a network that has PN, compared to a network that does not have PN. In other words, in the network that does not have PN, a certain unit adjusts a signal so as to achieve the highest capability at the output layer. However, in the network that has PN, a certain unit performs adjustment so as to provide favorable discriminative capability to all subsequent layers. As a result of this strict limitation, the discriminative capability at the output layer of the PDNN may have limitations.

Figure 12:
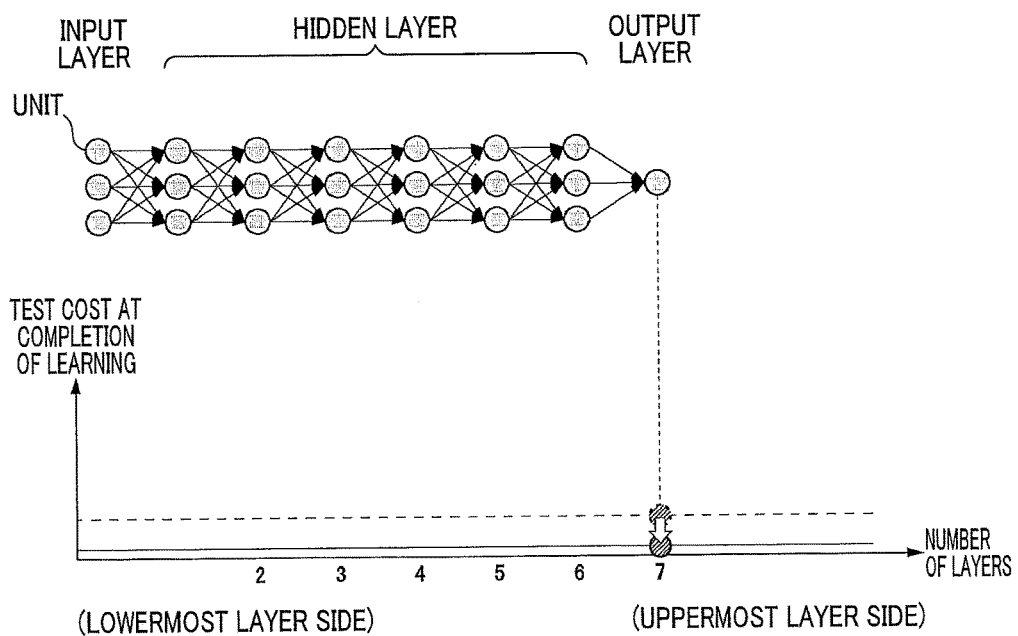
FIG. 12 is a diagram of the cost of a multilayer network obtained by removing a probing neuron from a fine-tuned multilayer neural network according to the embodiment.

The PDNN learning apparatus 100 performs learning of the PDNN, removal of unnecessary layers, and relearning as according to the above-described embodiment. The PDNN learning apparatus 100 performs the removal of the high-order layers and relearning until unnecessary layers no longer appear. While maintaining the current weights, the PDNN learning apparatus 100 removes all units and weights that are not fed forward to the output unit (PN and the weights connected to the PN in FIG. 2) from the network. The PDNN learning apparatus 100 outputs the network as the initial network of the learning unit 101. The learning unit 101 performs a learning process of the ordinary neural network that does not have PN. As a result of this learning process, as shown in FIG. 12, the cost of the ordinary multilayer network obtained is more reduced.

Second Application Example

In the present application example, a discriminator that uses the PDNN that is learned (trained) according to the above-described embodiment or the variation examples thereof will be described. High-speed discrimination using early rejection becomes possible by an appropriately trained PDNN. The discriminator in the present application example performs early rejection using the PDNN. In the present application example, the concept of early rejection will be described using pedestrian detection as an example.

Figure 13:
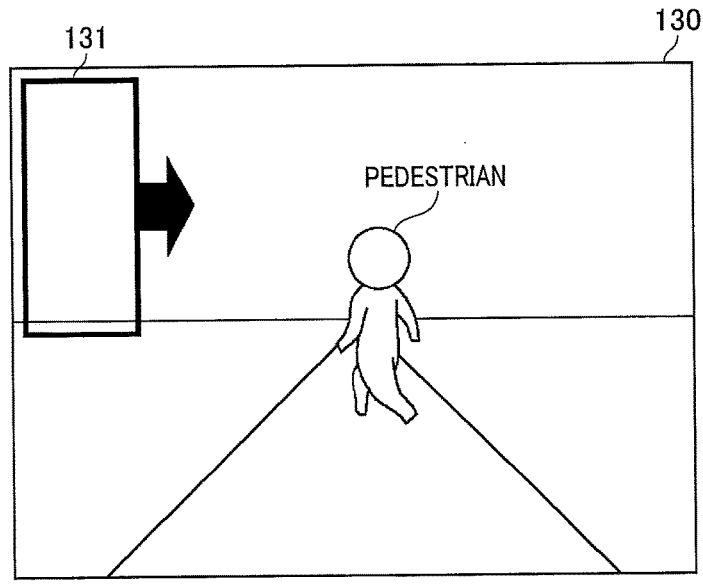
FIG. 13 is a diagram of an example in which a pedestrian is detected using an on-board camera in a second application example according to the embodiment.

FIG. 13 is a diagram of an example in which a pedestrian is detected using an on-board camera. As shown in FIG. 13, the discriminator performs exhaustive discrimination of an area (determines whether or not a target is present) by scanning a window 131 of the discriminator over an image 130. As in the example in FIG. 13, when the majority of the area within the window 131 is a background, discrimination of the overall image 130 is performed at an extremely high speed if, for example, discrimination of sections which are clearly not a pedestrian, such as the sky or a road surface, is increased in speed. Rejection of these areas which are not targets based on determination with little calculation amount is referred to as early rejection. In addition, discrimination that has higher reliability is performed in areas in which determination of whether or not the area is a target is difficult, using a method involving greater calculation amount. As a result, high discriminative capability can be maintained as a whole.

Figure 14:
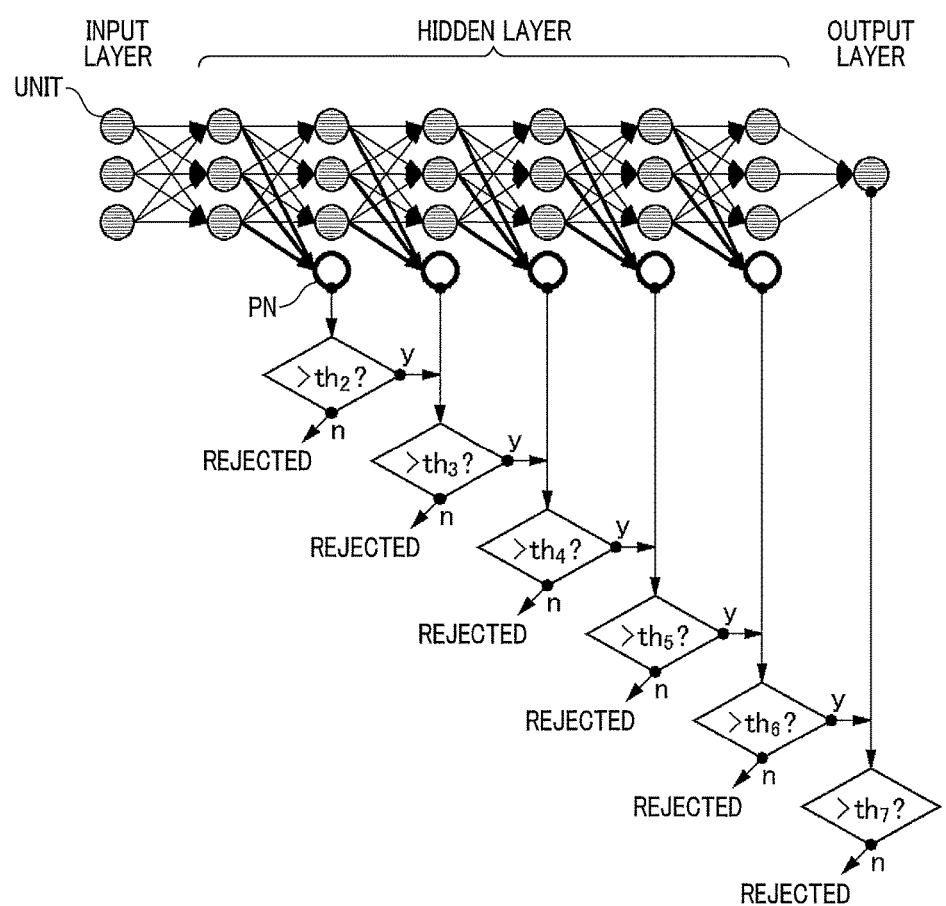
FIG. 14 is a diagram for explaining an early rejection process in the second application example according to the embodiment.

FIG. 14 is a diagram for describing an early rejection process using PN. In a PDNN that has been appropriately trained, each PN serves as a discriminator. Therefore, early rejection becomes possible. When a score indicating that an area is a background is sufficiently high (when the output value of the PN is a certain threshold or less or a certain threshold or more) when the output value of the first PN is calculated, the discrimination result at this time is "background". Calculation of layers higher than this layer is rejected. This rule is applied to the PN of all hidden layers. As a result, rejection in stages becomes possible.

Specifically, every time the output value of the PN of a hidden layer is calculated, the discriminator determines whether or not the output value of the PN is a threshold ($Th_2$, $Th_3$, . . . , $Th_7$ in FIG. 14) or less. When determined that the output value of the PN is the threshold or less, the discriminator immediately discriminates that a pedestrian is not present. When determined that the output value of the PN is not the threshold or less, the discriminator performs calculation at the next layer. When a target is not present in the majority of the windows, the actual calculation time becomes equivalent to that of a multilayer neural network having significantly less layers than the PDNN, regardless of how many layers the PDNN has, as a result of early rejection.

Third Application Example

Figure 15:
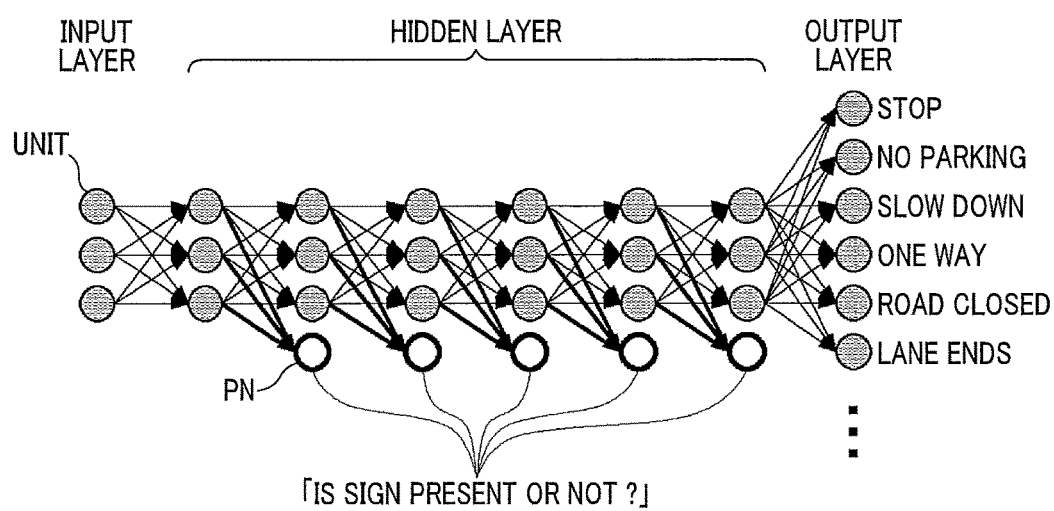
FIG. 15 is a diagram for explaining the early rejection process in a third application example according to the embodiment.

The third application example is a variation example of the second application example. In the present application example, the unit in the output layer and the PN of each layer are made to approximate different types of target values. Early rejection is thereby performed. FIG. 15 is a diagram of an early rejection process in the present application example. Hereafter, as an example, the application of the PDNN in FIG. 15 to an issue regarding sign recognition from an image captured by an on-board camera is considered.

The PN is trained to perform a binary classification. The binary classification involves whether or not a sign is present in an image patch. The sign may be any type of sign. Meanwhile, at the output layer, units that have each been trained to recognize unique signs are disposed. For example, a unit that performs binary classification regarding whether or not a stop sign is present, and a unit that performs binary classification regarding whether or not a no-parking sign is present are disposed.

Through use of this network, at the low-order layer, only binary classification regarding the presence of a sign is performed. Rejection can be performed with significantly less calculation amount compared to when recognition of all types of signs is exhaustively performed. When a sign is actually present in an image patch, exhaustive discrimination can be performed at the output layer. Therefore, the type of sign can be accurately recognized. The threshold for early rejection at each PN is decided through tuning, while balancing calculation time for the overall image and discriminative capability.

When learning is performed by the PDNN learning apparatus 100 for the discriminator in the present application example, each hidden layer has PN corresponding to all units of the output layer, that is, units for the stop sign, the no-parking sign, the slow down sign, and the like. All of these PN may be used as neurons used for early rejection in the discriminator as well. As a result, at each hidden layer, early rejection can be performed based on determination of whether or not the stop sign, the no-parking sign, the slow down sign, and the like are present.

Furthermore, when the possibility of early rejection being performed at the low-order hidden layer is low, neurons for early rejection may be provided from an intermediate hidden layer. As a result, wasting computation resources and time on inefficient computation for early rejection can be prevented.

Fourth Application Example

Figure 16:
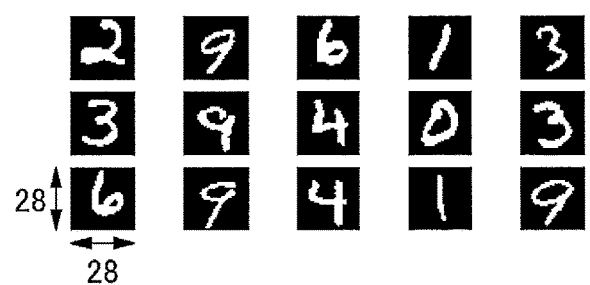
FIG. 16 is a diagram of a handwritten digit data set used in a fourth application example according to the embodiment.
Figure 17:
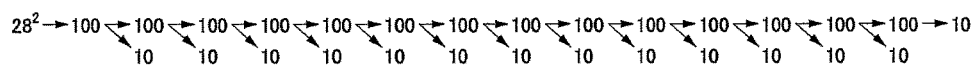
FIG. 17 is a diagram of a structure of the multilayer neural network in the fourth application example according to the embodiment.
Figure 18:
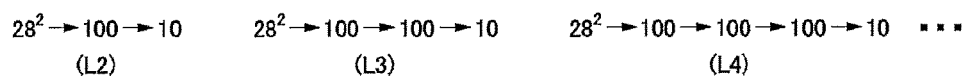
FIG. 18 is a diagram of a structure of a multilayer neural network obtained by conventional learning.

In the present application example, a discriminator is described that discriminates handwritten digits using the PDNN trained by the PDNN learning apparatus 100. FIG. 16 shows a data set for handwritten digits. Each digit is composed of 28×28 grayscale pixels. There are ten types of correct answers, from 0 to 9. FIG. 17 shows a network structure of the PDNN. FIG. 18 shows a structure of a multilayer neural network obtained by conventional learning without PN.

The number of units in each layer of the PDNN used by the discriminator of the present application example is one hundred. As described above, there are ten types in the output layer. Ten PN are provided in each hidden layer. Determination for early rejection is performed at each layer. A binary code corresponding to the black and white of the 28×28 pixels is inputted as input data.

Figure 19:
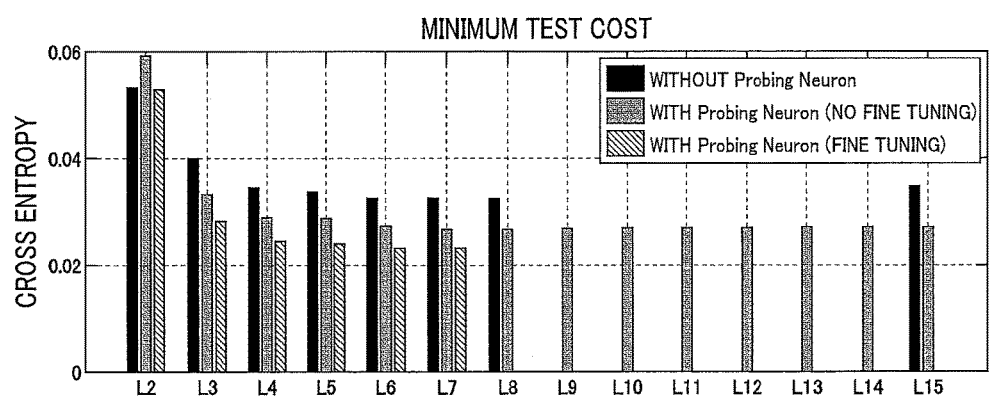
FIG. 19 is a graph of the results of a test conducted using the data set in FIG. 16.

FIG. 19 is a graph showing the results of a test conducted using the data set shown in FIG. 16. The test is conducted for a network that has been trained using PN (with probing neuron, i.e., no fine tuning), a network that has been trained using PN and has also been fine-tuned (with probing neuron, i.e., fine tuning), and a network that has been trained without using PN as shown in FIG. 18 (without probing neuron). FIG. 19 shows the cost in relation to the number of layers. Here, cross entropy is used for the cost. As shown in FIG. 19, after the third layer, the cost becomes lower in learning with PN compared to learning without PN. Cost is further reduced when fine tuning is performed.

Sixth Application Example

In the present application example, an example is described in which the PDNN learning apparatus 100 according to the above-described embodiment is applied as a learning apparatus for a CNN.

First, the CNN will be described. Regarding the CNN, an image recognition method using CNN is described in, for example, Y. LeCun, B. Boser, J. S. Denker, D. Henderson, R. E. Howard, W. Hubbard, and L. D. Jackel, "Handwritten Digit Recognition with a Back-propagation Network", Advances in Neural Information Processing Systems (NIPS), pp. 396-404, 1990.

Data used in CNN learning will be described. As training data, numerous pairs of two-dimensional array images and corresponding target values (multidimensional vectors or scalars) are provided. The two-dimensional array image serves as input into the network. The corresponding target value serves as output from the network. The two-dimensional array image serving as input may be a grayscale image or a color image having elements such as red (R), green (G), and blue (B). When the two-dimensional array image is a color image, the input is three two-dimensional arrays. In a manner similar to that according to the above-described embodiment, the training data is divided into a training data set and a test data set. The training data set is used to train the network. The test data set is used to evaluate the trained network.

Figure 20:
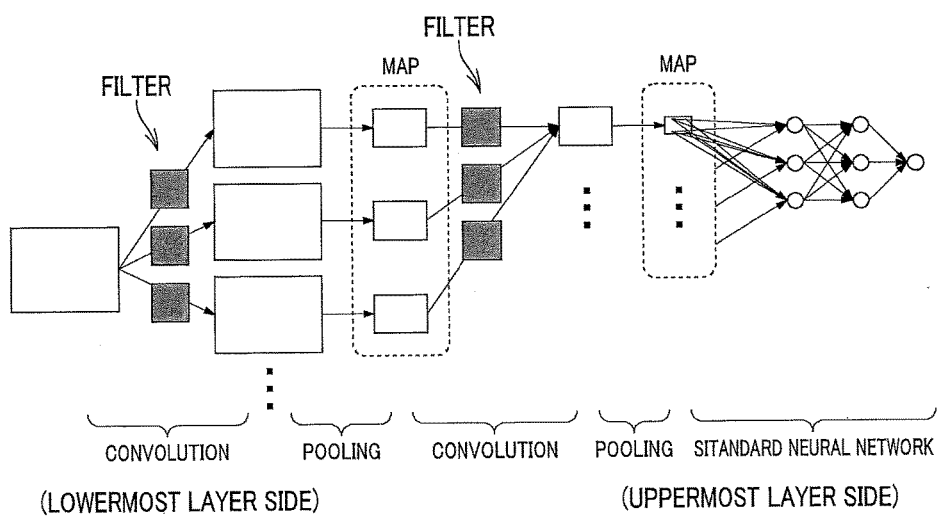
FIG. 20 is a diagram of a structure of a conventional convolutional neural network.

FIG. 20 is a diagram of a typical network structure of the CNN. First, convolution and pooling are performed on the input image. Convolution is performed using a filter. Pooling is an operation performed to reduce the resolution of the image. Convolution and pooling are repeatedly performed a number of times. When the resolution becomes sufficiently low, each pixel is connected to the feed-forward type multilayer neural network as input units. The hidden layers are omitted in FIG. 20.

The shaded elements in FIG. 20 are filters. The filter is a weight that has an element of n (pixels)×n (pixels). Bias may be added to the filter. As a result of the CNN being trained by the error back-propagation method, features that have robustness against localized distortion and are effective for discrimination can be extracted. Nonlinear mapping of the convoluted value is performed by an activation function, such as a sigmoid function (not shown). A signal obtained in this way is written as a two-dimensional array in a manner similar to the input.

The next computation is pooling. In typical pooling, a process is performed in which the above-described two-dimensional array is divided into 2×2 grids. The maximum value of four signals of each grid is then obtained. As a result of this process, the above-described two-dimensional array is reduced to one-fourth of the original size. Pooling enables information to be compressed without loss of features related to positions in the image. The two-dimensional array obtained as a result of pooling is referred to as a map. A collection of maps form a single hidden layer in the convoluted neural network.

Pooling other than that in the above-described example can also be performed. For example, max pooling may be performed as pooling. In max pooling, the maximum value is extracted from the 2×2 grids. Alternatively, subsampling may be performed. In subsampling, only a certain element (such as a (1,1) element) of a grid is extracted. Moreover, the grids may be overlapped. In any case, the methods are the same in terms of reducing the convoluted two-dimensional array.

Convolution and pooling are ordinarily repeated a plurality of times. In the example in FIG. 20, convolution and pooling are repeated twice. However, the number of repetitions may be more than two. After information is sufficiently compressed by repetition of convolution and pooling, an ordinary (not convolutional) neural network is applied.

In the example in FIG. 20, each element of the two-dimensional array obtained as a result of convolution and pooling being performed twice is connected to the ordinary neural network as a single unit. The ordinary neural network may be multilayered.

As described above, the CNN is a type of feed-forward multilayer neural network. In other words, the signal of a certain layer is a function of the weight between this signal and a signal of the layer that is one layer before the certain layer. In addition, this function is differentiable. Therefore, error back-propagation is applicable to the CNN. In the present application example, the PN are introduced to the CNN in a manner similar to that according to the above-described embodiment. The CNN to which the PN have been introduced is referred to as a probed convolutional neural network (PCNN). A learning apparatus for the PCNN is referred to as a PCNN learning apparatus. The PCNN is a CNN having a unit in each hidden layer. The unit has been trained so that the output value of the unit becomes closer to a target value.

Figure 21:
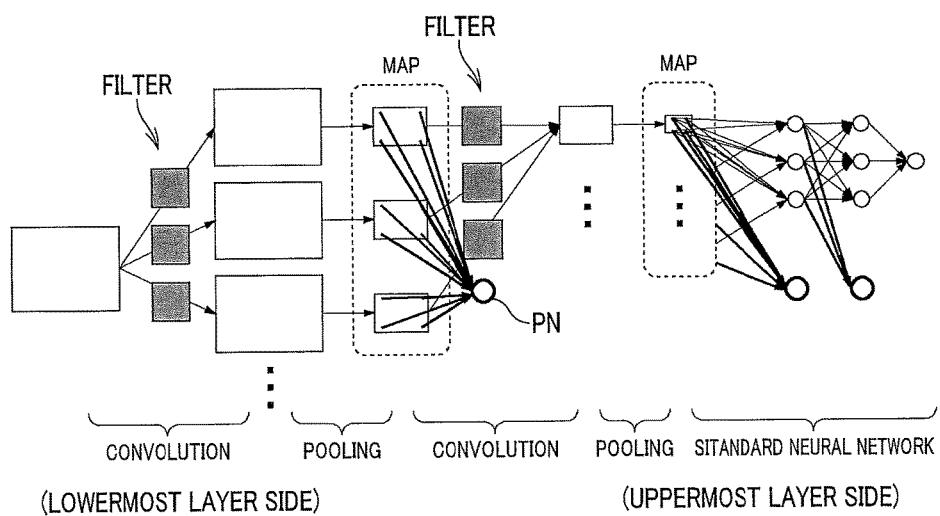
FIG. 21 is a diagram of a structure of a convolutional neural network in a sixth application example according to the embodiment.

FIG. 21 is a diagram of a network structure of the PCNN. As shown in FIG. 21, in the PCNN, a PN is connected to a map. The PN connected to the map may be connected to all pixels in the map. Alternatively, the PN may be connected to every other pixel in the vertical and lateral directions.

In a manner similar to the PDNN learning apparatus 100 according to the above-described embodiment, the PCNN learning apparatus includes the training data storage unit 11, the learning unit 12, the layer quantity adjusting unit 13, and the relearning unit 14. The PCNN learning apparatus performs learning by an expanded error back-propagation method. Furthermore, in a manner similar to that of the PDNN learning apparatus 100, the layer quantity adjusting unit 13 of the PCNN learning unit identifies at least one unnecessary layer at the uppermost layer side of the fully connected layers. The learning unit 13 then removes the identified at least one layer from the network. When the discriminative capability of the PN at the n-th layer of the plurality of convoluted (and pooled) layers does not exceed the discriminative capability of the PN of the n−1-th layer, the PCNN learning apparatus may generate a network from which the n-th convoluted (and pooled) layer has been removed. The PCNN learning apparatus may then reset the weights subsequent to the n-th layer with random numbers and repeat the learning process of the PCNN.

In addition, in a manner similar to that of the PDNN learning apparatus 100, the relearning unit 14 of the PCNN learning apparatus performs a relearning process of the network after layer removal. As a result, cost can be further reduced. In addition, as a method for providing a CNN that does not have PN with favorable initial values, the PCNN trained by the PCNN learning apparatus can be used. Furthermore, in a manner similar to the above-described application examples, the PCNN is also capable of high-speed detection through early rejection performed by a discriminator.

As described above, in the present embodiment, the layer quantity adjusting unit removes at least one unnecessary layer at the uppermost layer side from the multilayer neural network based on the learning process performed by the learning unit. Therefore, the present embodiment is useful as, for example, a learning apparatus that performs a learning process of a feed-forward multilayer neural network with supervised learning. The learning apparatus achieves an effect in which a multilayer neural network having sufficient generalization capability can be obtained without increase in processing load and the amount of time required for computation as a result of the number of layers being unnecessarily high.

What is claimed is:

1. A learning apparatus that performs a learning process for a feed-forward multilayer neural network with supervised learning, the learning apparatus comprising:
a processor configured to:
perform a learning process by calculation of a cost derived by a cost function defined in a multilayer neural network using a training data set for supervised learning, the multilayer neural network comprising: a plurality of layers configured by an input layer that is a lowermost layer of a layered structure of the multilayer neural network; an output layer that is an uppermost layer of the layered structure; and at least one hidden layer that is located between the input layer and the output layer, each of the layers including a given number of units that receive an input from the lowermost layer side, perform a predetermined calculation based on the input and a weight to produce an output, and transfer the output toward the uppermost layer side, the at least one hidden layer including at least one probing neuron that receives an input from the lowermost layer side, performs a predetermined calculation based on the input and a weight to produce an output, but does not transfer the output to the uppermost layer side;
remove at least one uppermost layer from the multilayer neural network based on the cost derived by the output from the at least one probing neuron, and set, as the output layer, the at least one probing neuron in the uppermost layer of the remaining layers; and
output data of the multilayer neural network learned in the learning process, whereby a discrimination process using the learned data is performed, the discrimination process including determining whether or not a predetermined target is present in an image acquired by a camera and generating data indicating whether or not the predetermined target is present in the image acquired by the camera.

2. The learning apparatus according to claim 1, wherein:
the processor is further configured to perform a relearning process for the multilayer neural network from which the at least one layer has been removed by the processor.

3. The learning apparatus according to claim 2, wherein:
the processor is further configured to remove at least one uppermost layer from the multilayer neural network based on the cost of the at least one probing neuron, for the multilayer neural network that has been relearned by the relearning unit, and set, as the output layer, the probing neuron in the uppermost layer of the remaining layers.

4. The learning apparatus according to claim 3, wherein:
when the cost of the output layer is not the lowest, the processor is further configured to remove at least one uppermost layer from the multilayer neural network so as to keep the at least one probing neuron of the at least one hidden layer at an upper layer side compared to the at least one hidden layer that has the at least one probing neuron of which the cost is the lowest.

5. The learning apparatus according to claim 1, wherein:
the processor is further configured to set, as the output layer, the at least one probing neuron of which the cost is the lowest.

6. The learning apparatus according to claim 1, wherein:
a section connected to the probing neuron has a layered structure.

7. A learning system comprising:
a first learning apparatus that is configured by the learning apparatus according to claim 1; and
a second learning apparatus that comprises a processor configured to perform a learning process for a feed-forward multilayer neural network with supervised learning, the second learning apparatus using, as an initial feed-forward multilayer neural network, the feed-forward multilayer neural network that has been learned by the first learning apparatus from which the at least one probing neuron have been removed.

8. A discriminator for performing a discrimination process using the feed-forward multilayer neural network obtained by the learning apparatus according to claim 1, wherein:
the discriminator is configured to perform a discrimination process using the probing neuron of the feed-forward multilayer neural network and perform an early rejection in the feed-forward multilayer neural network.

9. The discriminator according to claim 8, wherein:
the discriminator is configured to perform, using the probing neuron, the discrimination process by determining whether to correspond to the units of the output layer and perform an early rejection in the feed-forward multilayer neural network.

10. The learning apparatus according to claim 1, wherein the predetermined target is a pedestrian.

11. The learning apparatus according to claim 1, wherein the predetermined target is a sign.

12. A learning apparatus that performs a learning process for a feed-forward convolutional neural network with supervised learning, the learning apparatus comprising:
a processor configured to:
perform a learning process by calculation of a cost derived by a cost function defined in a convolutional neural network using a training data set for supervised learning, the convolutional neural network repeatedly performing, for an input image, a convolution process using a filter and a pooling process to reduce a resolution of the input image, and producing compressed information of convoluted two-dimensional array of a map forming at least one hidden layer, the convolutional neural network including at least one probing neuron connected to the map in the at least one hidden layer; and
remove at least one layer at an uppermost layer side from the convolutional neural network based on the cost derived by the output from the at least one probing neuron, and set, as an output layer for the convolution process, the at least one probing neuron in the uppermost layer of the remaining layers.

13. A non-transitory computer-readable storage medium storing a learning program for enabling a computer to perform a learning process for a feed-forward multilayer neural network with supervised learning, the learning process comprising:
performing a learning process by calculation of a cost derived by a cost function defined in a multilayer neural network using a training data set for supervised learning, the multilayer neural network comprising: a plurality of layers configured by an input layer that is a lowermost layer of a layered structure of the feed-forward multilayer neural network, an output layer that is an uppermost layer of the layered structure, and at least one hidden layer that is located between the input layer and the output layer, each of the layers including a given number of units that receive an input from the lowermost layer side, perform a predetermined calculation based on the input and a weight to produce an output, and transfer the output to the uppermost layer side, the at least one hidden layer including at least one probing neuron that receives an input from the lowermost layer side, performs a predetermined calculation based on the input and a weight to produce an output, but does not transfer the output to the uppermost layer side;
removing at least one uppermost layer from the multilayer neural network based on the cost derived by the output from the at least one probing neuron, and setting, as the output layer, the at least one probing neuron in the uppermost layer of the remaining layers; and
outputting data of the multilayer neural network learned in the learning process, whereby a discrimination process using the learned data is performed, the discrimination process including determining whether or not a predetermined target is present in an image acquired by a camera and generating data indicating whether or not the predetermined target is present in the image acquired by the camera.

14. A learning method for performing a learning process for a feed-forward multilayer neural network with supervised learning, the learning method comprising:
performing, by a processor provided in a learning apparatus, a learning process by calculation of a cost derived by a cost function defined in a multilayer neural network using a training data set for supervised learning, the multilayer neural network comprising: a plurality of layers configured by an input layer that is a lowermost layer side of the multilayer neural network, an output layer that is an uppermost layer side of feed-forward multilayer neural network, and at least one hidden layer that is located between the input layer and the output layer, each of the layers including a given number of units that receive an input from the lowermost layer side, perform a predetermined calculation based on the input and a weight to produce an output, and transfer the output to the uppermost layer side, the at least one hidden layer including at least one probing neuron that receives an input from the lowermost layer side, performs a predetermined calculation based on the input and a weight to produce an output, but does not transfer the output to the uppermost layer side;
removing, by the processor, at least one uppermost layer from the feed-forward multilayer neural network based on the cost derived by the output from the at least one probing neuron, and setting, as the output layer, the at least one probing neuron in the uppermost layer of the remaining layers; and
outputting data of the multilayer neural network learned in the learning process, whereby a discrimination process using the learned data is performed, the discrimination process including determining whether or not a predetermined target is present in an image acquired by a camera and generating data indicating whether or not the predetermined target is present in the image acquired by the camera.

15. An on-board camera apparatus for acquiring an image and detecting a target based on the acquired image, the on-board camera apparatus comprising:
a discriminator that performs a discrimination process for the acquired image, using data of a multilayer neural network learned in a learning process performed by a learning apparatus, the discrimination process including determining whether or not a predetermined target is present in the acquired image and generating data indicating whether or not the predetermined target is present in the acquired image, wherein the learning apparatus comprises:
a processor configured to:
perform a learning process by calculation of a cost derived by a cost function defined in a multilayer neural network using a training data set for supervised learning, the multilayer neural network comprising: a plurality of layers configured by an input layer that is a lowermost layer of a layered structure of the multilayer neural network; an output layer that is an uppermost layer of the layered structure; and at least one hidden layer that is located between the input layer and the output layer, each of the layers including a given number of units that receive an input from the lowermost layer side, perform a predetermined calculation based on the input and a weight to produce an output, and transfer the output toward the uppermost layer side, the at least one hidden layer including at least one probing neuron that receives an input from the lowermost layer side, performs a predetermined calculation based on the input and a weight to produce an output, but does not transfer the output to the uppermost layer side;

remove at least one uppermost layer from the multilayer neural network based on the cost derived by the output from the at least one probing neuron, and set, as the output layer, the at least one probing neuron in the uppermost layer of the remaining layers; and output data of the multilayer neural network learned in the learning process to the discriminator, whereby the discriminator performs the discrimination process using the learned data.

* * * * *